(12) United States Patent
Parkin

(10) Patent No.: US 7,926,994 B2
(45) Date of Patent: Apr. 19, 2011

(54) UNIFORM LIGHT PRODUCTION SYSTEM AND APPARATUS

(75) Inventor: John Parkin, Kitchener (CA)

(73) Assignee: Christie Digital Systems USA, Inc., Cypress, CA (US)

(*) Notice: Subject to any disclaimer, the term of this patent is extended or adjusted under 35 U.S.C. 154(b) by 417 days.

(21) Appl. No.: 12/014,874

(22) Filed: Jan. 16, 2008

(65) Prior Publication Data
US 2009/0180083 A1 Jul. 16, 2009

(51) Int. Cl.
*F21V 7/04* (2006.01)

(52) U.S. Cl. ........ 362/552; 362/551; 362/558; 362/581; 362/26; 362/29

(58) Field of Classification Search ........... 362/551, 362/558, 581, 23, 26, 27, 29, 30, 253, 293, 362/362, 19
See application file for complete search history.

(56) References Cited

U.S. PATENT DOCUMENTS

| | | | |
|---|---|---|---|
| 5,867,319 A * | 2/1999 | Sugiyama et al. | 359/618 |
| 6,464,366 B1 * | 10/2002 | Lin et al. | 362/616 |
| 6,962,426 B2 * | 11/2005 | Slobodin | 362/298 |
| 7,192,173 B2 * | 3/2007 | Vaughnn | 362/558 |
| 7,712,924 B2 * | 5/2010 | Ma | 362/285 |
| 2002/0149924 A1 * | 10/2002 | Falicoff et al. | 362/19 |

FOREIGN PATENT DOCUMENTS

| | | |
|---|---|---|
| DE | 198 32 665 A1 | 1/2000 |
| EP | 1 164 403 A1 | 12/2001 |
| GB | 2 228 344 A | 8/1990 |

OTHER PUBLICATIONS

European Search Report Jul. 10, 2009 in corresponding European Patent Application 09 25 0103.

* cited by examiner

*Primary Examiner* — Sandra L O Shea
*Assistant Examiner* — Jessica L McMillan
(74) *Attorney, Agent, or Firm* — Staas & Halsey LLP

(57) ABSTRACT

A light production system and apparatus for adjusting the uniformity of light is provided. The apparatus comprises a light reducing portion, having an area less than that of an exit of an integrator, for reducing the brightness of a central area of light emitted from the exit. The apparatus further comprises a mounting portion for mounting the light reducing portion in general longitudinal alignment with a center of the exit, the mounting portion enabled to transmit the light emitted from the exit.

24 Claims, 11 Drawing Sheets

UNIFORM LIGHT PRODUCTION SYSTEM AND APPARATUS

FIELD

The specification relates generally to optical systems, and specifically to a uniform light production system and apparatus.

BACKGROUND

When providing a light production system for a projector, it is important that the light emitted from the light production system be generally uniform to provide a non-distracting viewing experience. Unfortunately light emitted from lamps such as elliptical lamps and parabolic lamps is generally not uniform, with the center of the lamp being brightest, the brightness decreasing towards the edges. In addition, projection lens systems tend to have a relative illumination profile that is brighter towards the center of a projected image. Hence, even with the use of integrators, the overall image that is projected onto a screen has a tendency towards being brighter at the center than at the edges. When the corner point brightness becomes too low in comparison to the center point brightness, the image may appear to have an undesirable "hot spot" (or high brightness region) in the center screen position. Not only is this unacceptable for a viewer, but will cause a projector to fail industry standards, such as those set by the Digital Cinema Initiative (DCI).

While the problem may be addressed by modulating the image via an electronic correction (e.g. in an image generating light modulation component), this solution is both expensive and complex, requiring considerable use of system resources and is further only applicable to digital projectors.

SUMMARY

A first broad aspect of an embodiment seeks to provide an apparatus for adjusting the uniformity of light. The apparatus comprises a light reducing portion having an area less than that of an exit of an integrator, for reducing the brightness of a central area of light emitted from the exit. The apparatus further comprises a mounting portion for mounting the light reducing portion in general longitudinal alignment with a center of the exit, the mounting portion enabled to transmit the light emitted from the exit.

In some embodiments of the first broad aspect, a lamp facing side of the light reducing portion is enabled to reflect the light back towards the exit and through the integrator, such that the light is further reflected from a reflector of a lamp in axial alignment with an entrance of the integrator and back through the integrator, re-emerging from the exit in an area outside of the central area.

In other embodiments of the first broad aspect, the mounting portion further comprises a position adjusting unit for adjusting a position of the light reducing portion relative to the exit. In some of these embodiments, the position adjusting unit comprises an electro-mechanical device for remote control of the position. In some of these embodiments, the position adjusting unit is enabled to communicate with a feedback system for receiving signals from the feedback system for adjusting the position such that a brightness profile is adjusted to a given level, the feedback system for capturing a brightness profile of the light emitted from the exit.

In further embodiments of the first broad aspect, the apparatus further comprises a light transmitting portion surrounding the light reducing portion, the light transmitting portion attached to the mounting portion. In some of these embodiments, the light reducing portion comprises an optical coating on the light transmitting portion. In some embodiments, the optical coating comprises at least one of a metallic coating and a dielectric coating. In other embodiments, the optical coating is at least one of reflective, partially reflective, and diffuse. In further embodiments, the light reducing portion comprises at least one of glass and a lens.

In yet further embodiments of the first broad aspect, the light reducing portion comprises a disc attached to the mounting portion via a supporting arm.

In some embodiments of the first broad aspect, the mounting portion comprises a sleeve mountable within a light production system of a projector.

A second broad aspect of an embodiment seeks to provide a light production system. The light production system comprises a lamp for producing a beam of light. The light production system further comprises an integrator having an entrance in longitudinal alignment with the lamp and enabled for accepting the light, an exit for emitting the light, and a body for conveying the light to the exit. The light production system further comprises: a light reducing module, having a light reducing portion of an area less than that of the exit, for reducing the brightness of a central area of light emitted from the exit, and a mounting portion for mounting the light reducing portion in general longitudinal alignment with a center of the exit, the mounting portion enabled to transmit the light emitted from the exit.

In some embodiments of the second broad aspect, a lamp facing side of the light reducing portion is enabled to reflect the light back towards the exit and through the integrator, such that the light is further reflected from a reflector of the lamp in axial alignment with the entrance and back through the integrator, re-emerging from the exit in an area outside of the central area.

In other embodiments of the second broad aspect, the mounting portion further comprises a position adjusting unit for adjusting a position of the light reducing portion relative to the exit. In some embodiments, the position adjusting unit comprises an electro-mechanical device for remote control of the position. In some embodiments, the light production system further comprises a feedback system for capturing a brightness profile of the light emitted from the exit, wherein the position adjusting unit is enabled to communicate with the feedback system for receiving signals from the feedback system for adjusting the position such that a brightness profile is adjusted to a given level.

In further embodiments of the second broad aspect, the light reducing module further comprises a light transmitting portion surrounding the light reducing portion, the light transmitting portion attached to the mounting portion. In some embodiments, the light reducing portion comprises an optical coating on the light transmitting portion. In some embodiments, the optical coating comprises at least one of a metallic coating and a dielectric coating. In other embodiments, the optical coating is at least one of reflective, partially reflective, and diffuse.

In yet further embodiments of the second broad aspect, the light reducing portion comprises a disc attached to the mounting portion via a supporting arm.

In some embodiments of the second broad aspect, the mounting portion comprises a sleeve mountable within a light production system of a projector.

In other embodiments of the second broad aspect, the light production system comprises a component of a projector, the projector comprising: illumination relay optics for conveying the light emitted from the exit through the projector, the exit arranged to channel light to the illumination relay optics; a light modulation apparatus for accepting light from the illumination relay optics and causing the light from the illumination relay optics to be formed into an image; and at least one projection component for accepting the image from the light modulation apparatus and projecting the image.

BRIEF DESCRIPTIONS OF THE DRAWINGS

Embodiments are described with reference to the following figures, in which.

DETAILED DESCRIPTION OF THE EMBODIMENTS

Figure 1:
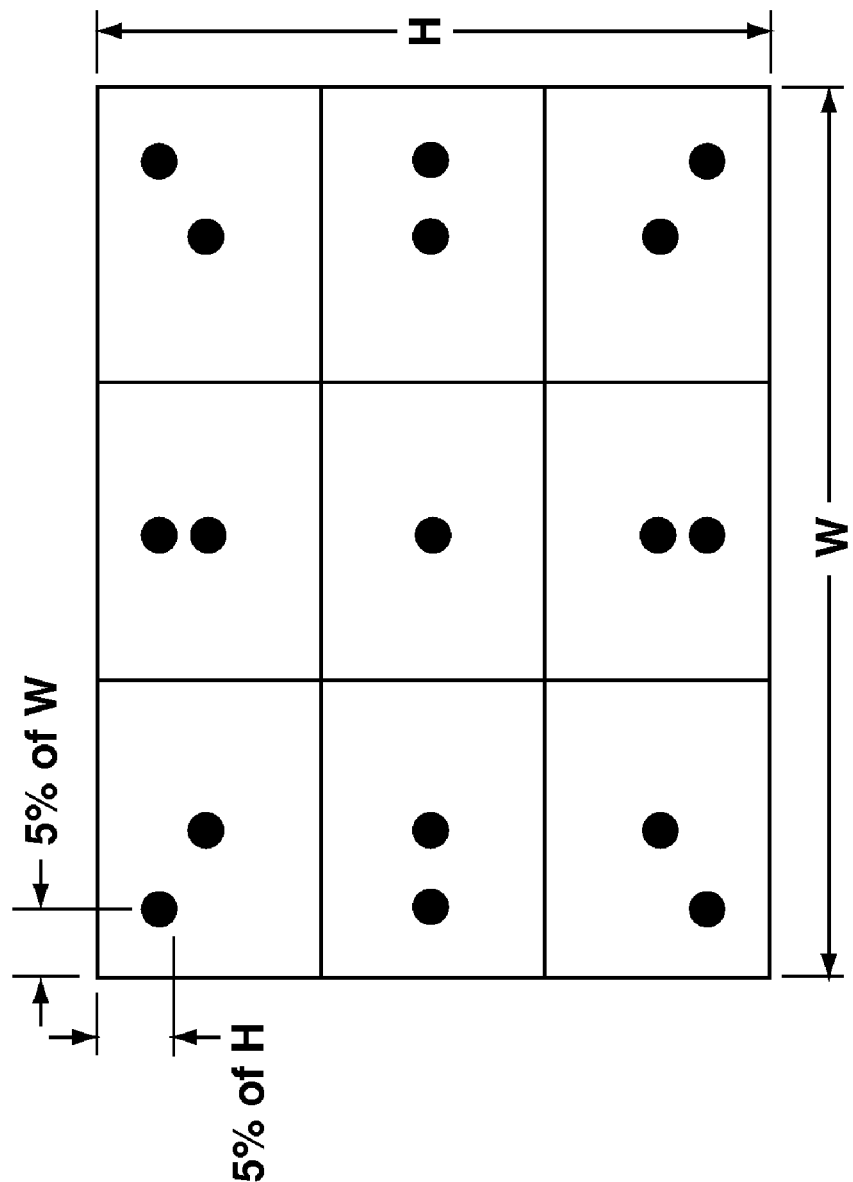
FIG. 1 depicts, a specification for measuring brightness uniformity in according to a non-limiting embodiment.

Some non-limiting specifications for measuring projector brightness uniformity, such as specifications set by the Digital Cinema Initiatives (DCI), stipulate the measurement of 17 points on a projected image in a review room as depicted in FIG. 1, when a projector display is set to a full white image. (A review room is generally defined as a standard for most critical colorimetry applications, recommended for Digital Cinema Mastering processes, as known to one of skill in the art.) Other test conditions may generally be specified, such as the image size, projection lens used, color temperature settings, screen luminance level, chromaticity etc. The brightness recorded at each position between the corner points and the center points is commonly used to quantify the overall relative illumination of the screen image. When the corner point brightness becomes too low in comparison to the center point brightness, the image may appear to have an undesirable 'hot spot' (or high brightness region) in the center screen position.

The DCI specification for review rooms requires the corner points to be no less than 80% of relative illumination when compared with the center point. While the DCI specification is specifically for digital projection, the DCI specification is not to be considered unduly limiting, and any specification for projection systems, including analogue projection systems, is within the scope of the present specification.

Figure 2:
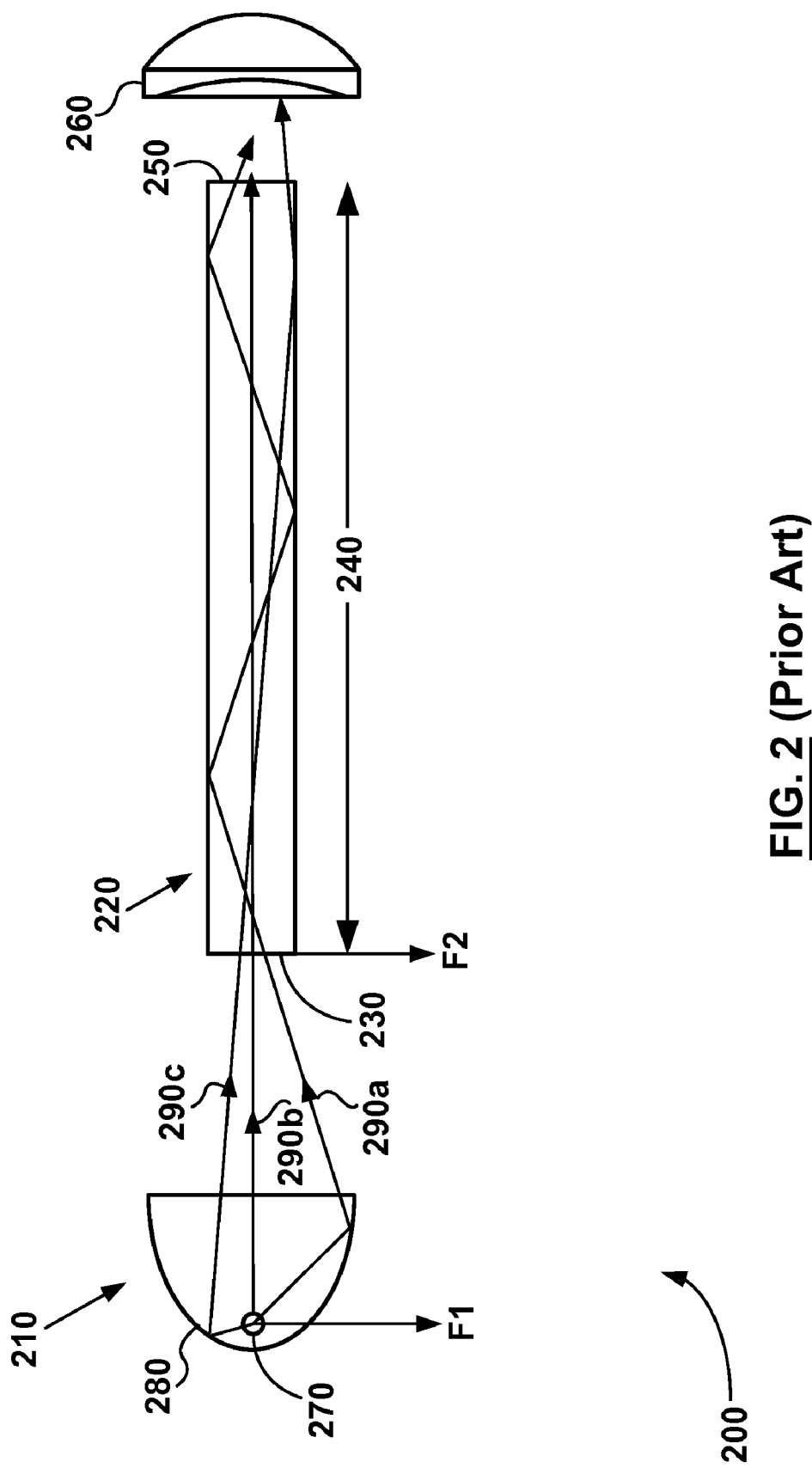
FIG. 2 depicts a light production system for a projector, according to the prior art.

FIG. 2 depicts a light production system 200 for a projector, according to the prior art, comprising a lamp 210 for producing light, and an integrator 220. In the depicted embodiment, the lamp 210 comprises an elliptical lamp however, in other embodiments, the lamp 210 comprises a parabolic lamp. The integrator 220 has an entrance 230 enabled for accepting light from the lamp 210, and a body 240 for conveying light to an exit 250. As known to one of skill in the art, the integrator 220 collects the light which impinges on the entrance 230, and channels the light to another optical component, for example illumination relay optics (of which only a lens 260 is depicted) and ultimately a light modulator (not depicted), while simultaneously scattering the light internally to create a more uniform beam of light.

In embodiments where the lamp 210 is an elliptical lamp, the lamp 210 comprises a light source 270 located at a first focal point, F1, and an elliptical reflector 280 for focussing light emitted from the light source 270 onto the entrance 230, generally located at a second focal point F2 of the lamp 210. In embodiments where the lamp 210 is a parabolic lamp, light emerging from the lamp is generally parallel, and a focussing lens may be located between the lamp 210 and the integrator 220, for focussing light from the lamp 210 on the entrance 230.

Also depicted in FIG. 2 are light rays 290a, 290b and 290c (collectively light rays 290 and generically light ray 290) emitted from the lamp 210, which are seen entering the entrance 230. The light rays 290a and 290b are generally emitted at angles which cause the light ray 290a and the light ray 290b to form part of a central area of light emitted from the exit 250. The light ray 290a and the light ray 290b will hence contribute to the central area of a projected image. In contrast, the light ray 290c is general generally emitted at an angle which causes the light ray 290c to form part of an edge and/or corner area of light emitted from the exit 250. The light ray 290c will hence contribute to the edge and/or corner area of a projected image. The projected image is formed after the light rays pass through the light illumination relay optics, and interact with the light modulator, prior to being projected via projection apparatus (not depicted). It is further understood that FIG. 2 represents a two dimensional depiction of the integrator 220, and that the light rays 290 are travelling within the two dimensional plane depicted. In some embodiments, the light rays 290 may be travelling in a plane that is at an angle to the plane depicted.

Figure 3:
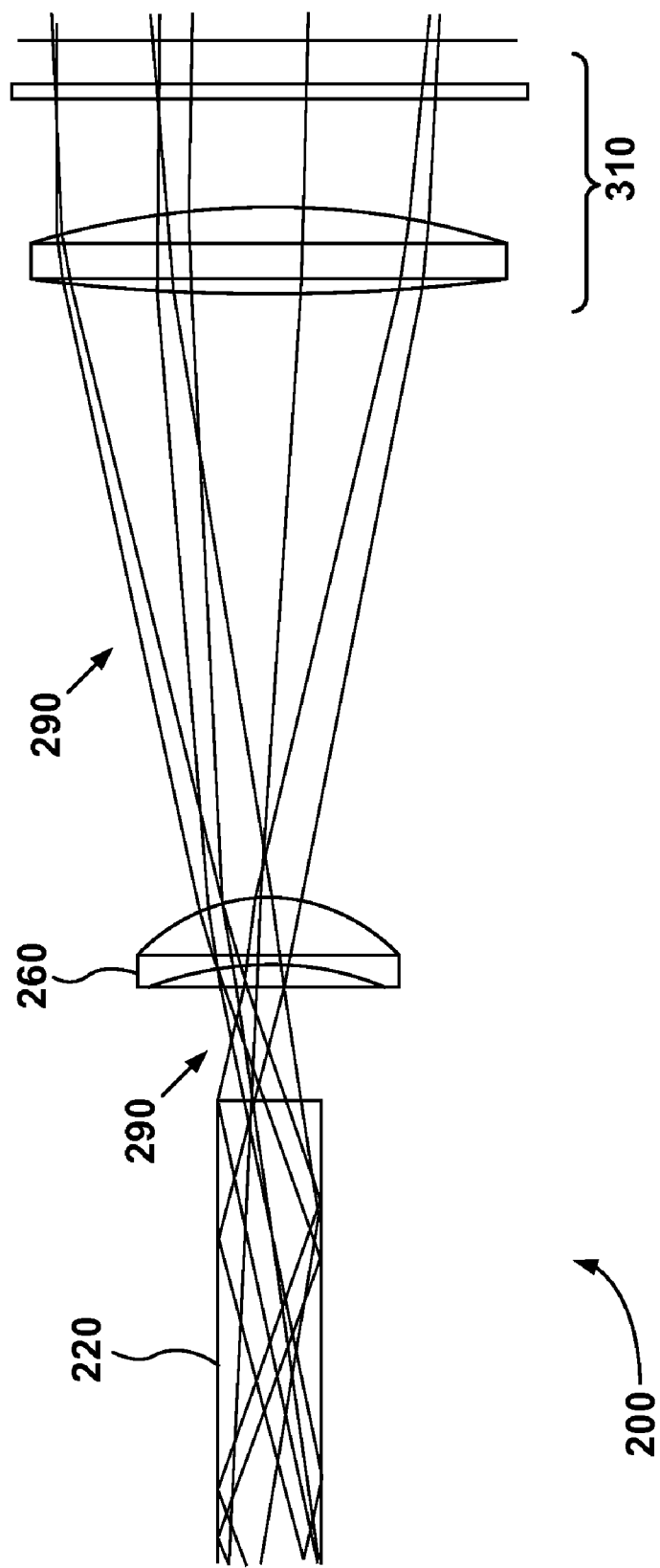
FIG. 3 depicts detail of the system depicted in FIG. 2.

FIG. 3 depicts detail of the system 200, to illustrate additional light rays 290 as they emerge from the exit 290 of the integrator 220 (partially depicted), and pass through the illumination relay optics (including the lens 260, and additional components 310).

Figure 4:
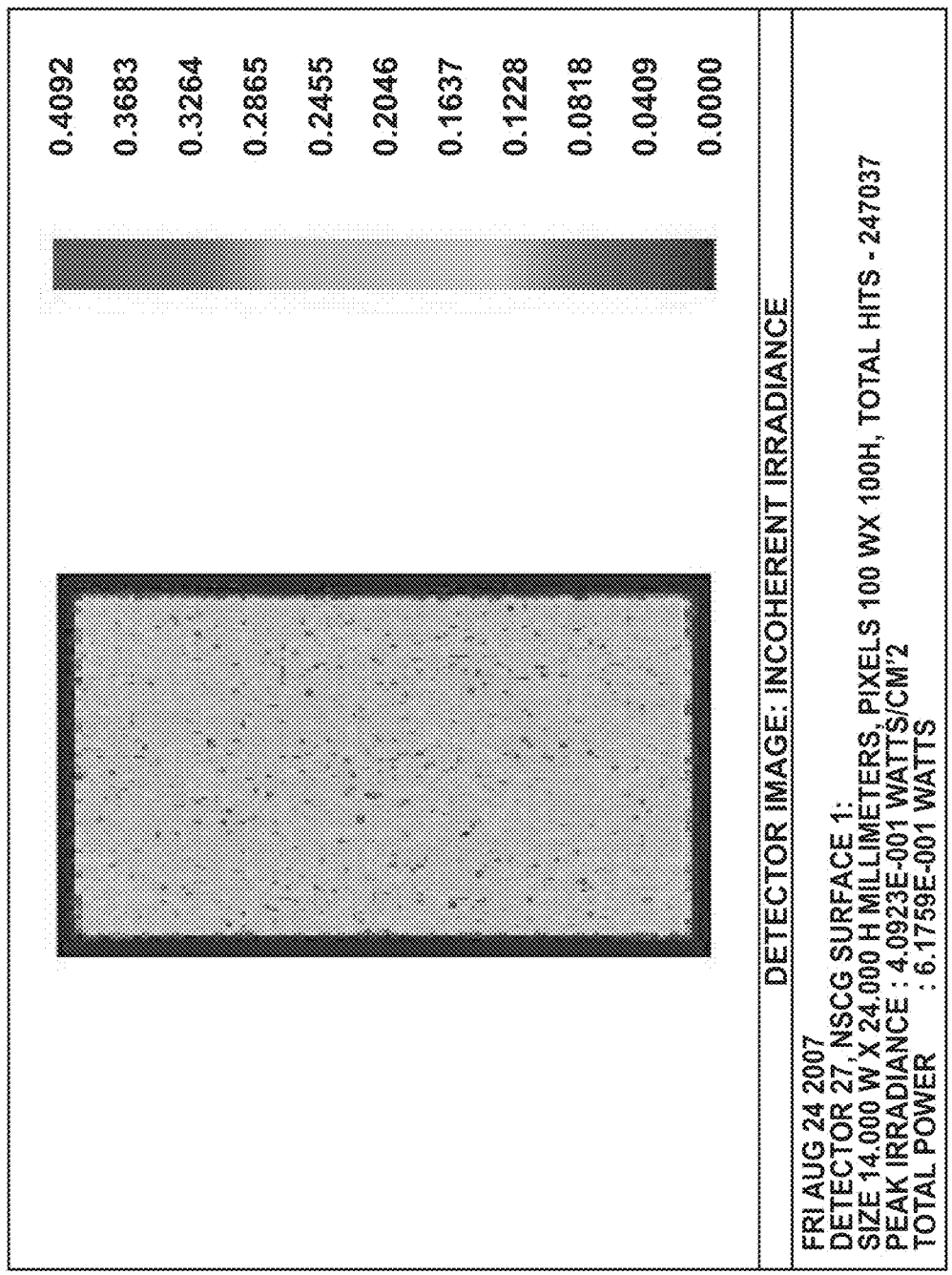
FIG. 4 depicts measured uniformity of light illuminating a light modulator, the light originating from a prototype of the system depicted in FIG. 2.

FIG. 4 depicts the simulated uniformity of light illuminating a light modulator (in this embodiment, a digital micromirror device (DMD), the light originating from a prototype of the system depicted in FIG. 2. The brightness of the corners of the light illuminating the DMD are seen to be less than of the central area. Three separate measurement conditions revealed that the brightness corner points were 71%, 73% and 78% of that of the central area, using the brightness measurement specification depicted in FIG. 1. Further, when the light depicted in FIG. 4 is reflected from the DMD and through a projection lens system in a projector, the brightness of the corners and the edges will further decrease due to the properties of the projection lens system. For example, see FIG. 11 described below.

Figure 5:
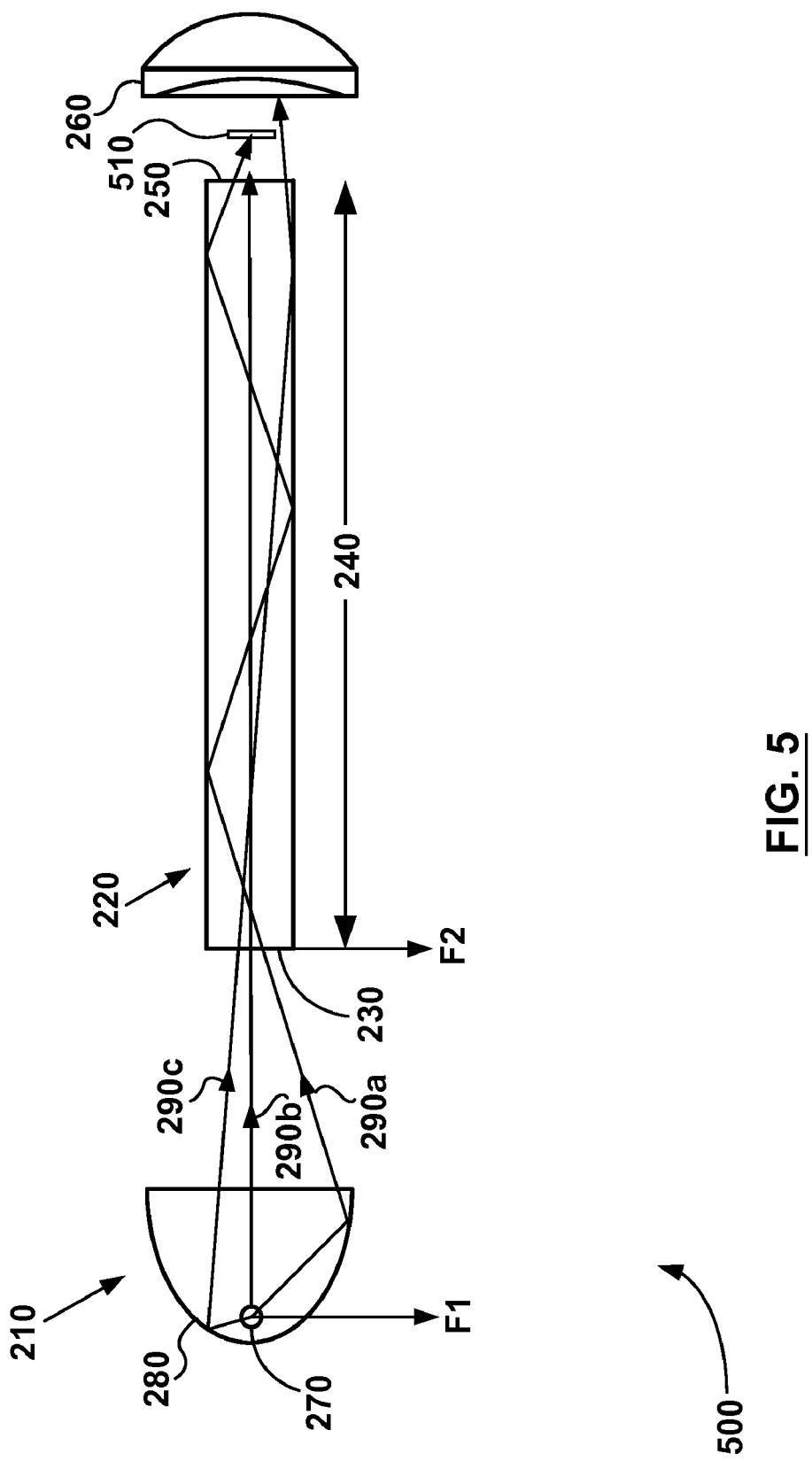
FIG. 5 depicts a system for adjusting the uniformity of light emitted from the exit of an integrator, according to a non-limiting embodiment.

FIG. 5 depicts a system 500 for adjusting the uniformity of light emitted from the exit 250 of the integrator 220, the system 500 being substantially similar to the system 200 with like elements depicted with like numbers. The system 500 comprises a light reducing portion (LRP) 510, which in the depicted embodiment, is mounted proximal the exit 250, in general axial alignment with the exit 250. In general, the LRP 510 has an area less than that of the exit 250 (or the entrance 230 if mounted proximal the entrance 230), and reduces the brightness of a central area of light emitted from the exit 250 by blocking light rays in the central area, for example light rays 290a and 290b. However, light rays 290 which are outside the central area (i.e. closer to the corners and/or edges), such as light ray 290c are not blocked and continue in their path through the illumination relay optics. Due to the homogenizing of light as it travels through the integrator, an effect known to one of skill in the art, the central area of a projected image is not completely in the shadow of the LRP 510. Indeed, in some embodiments, the central area may still be brighter than the corners and/or edges, however the overall brightness of the central area is generally reduced, while the brightness of the corners and/or edges is not.

Figure 6:
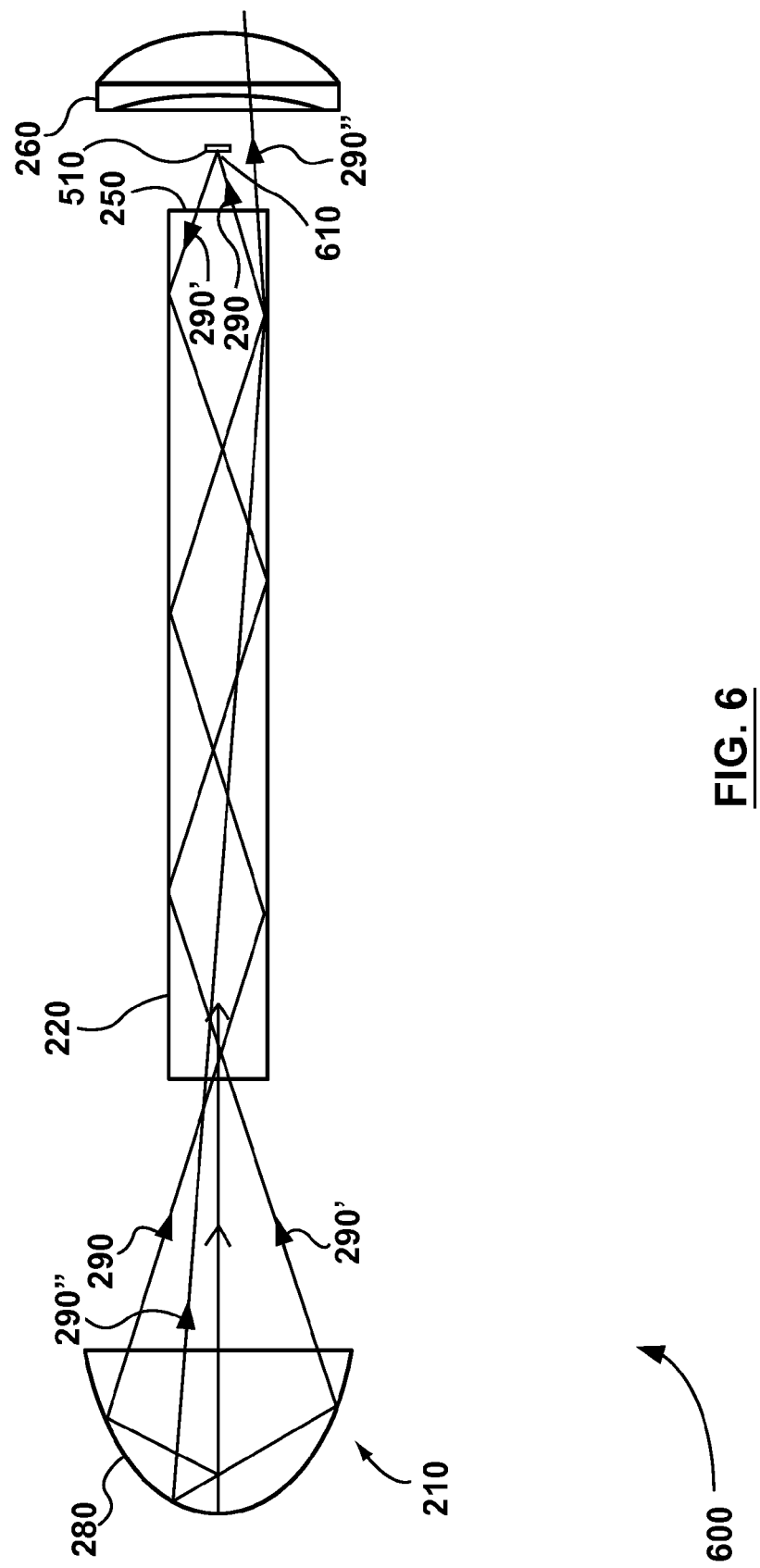
FIG. 6 depicts a system for adjusting the uniformity of light emitted from the exit of an integrator, according to a non-limiting embodiment.

In some embodiments, as in the system 600 depicted in FIG. 6 (substantially similar to the system 500 with like elements depicted with like numbers), a lamp facing side 610 of the LRP 510 is reflective. Hence light rays 290 impinging on the LRP 510 are reflected back into the integrator 220 through the exit 250 (labelled light ray 290'), and ultimately back into the lamp 210. The reflected light ray 290' then reflects twice from the reflector 280 (now labelled light ray 290"), and emerges from the lamp 210 at an angle which causes the now thrice reflected light ray 290" to form part of an edge and/or corner area of light emitted from the exit 250, due to the properties of the elliptical reflector 280. Hence the LRP 510 with a reflective lamp facing side 610 causes the contribution of the light rays 290 to the central area of light emitted from the exit 250 to be reduced, and the contribution of the light rays 290 the edge and/or corner areas to be increased.

Figure 7:
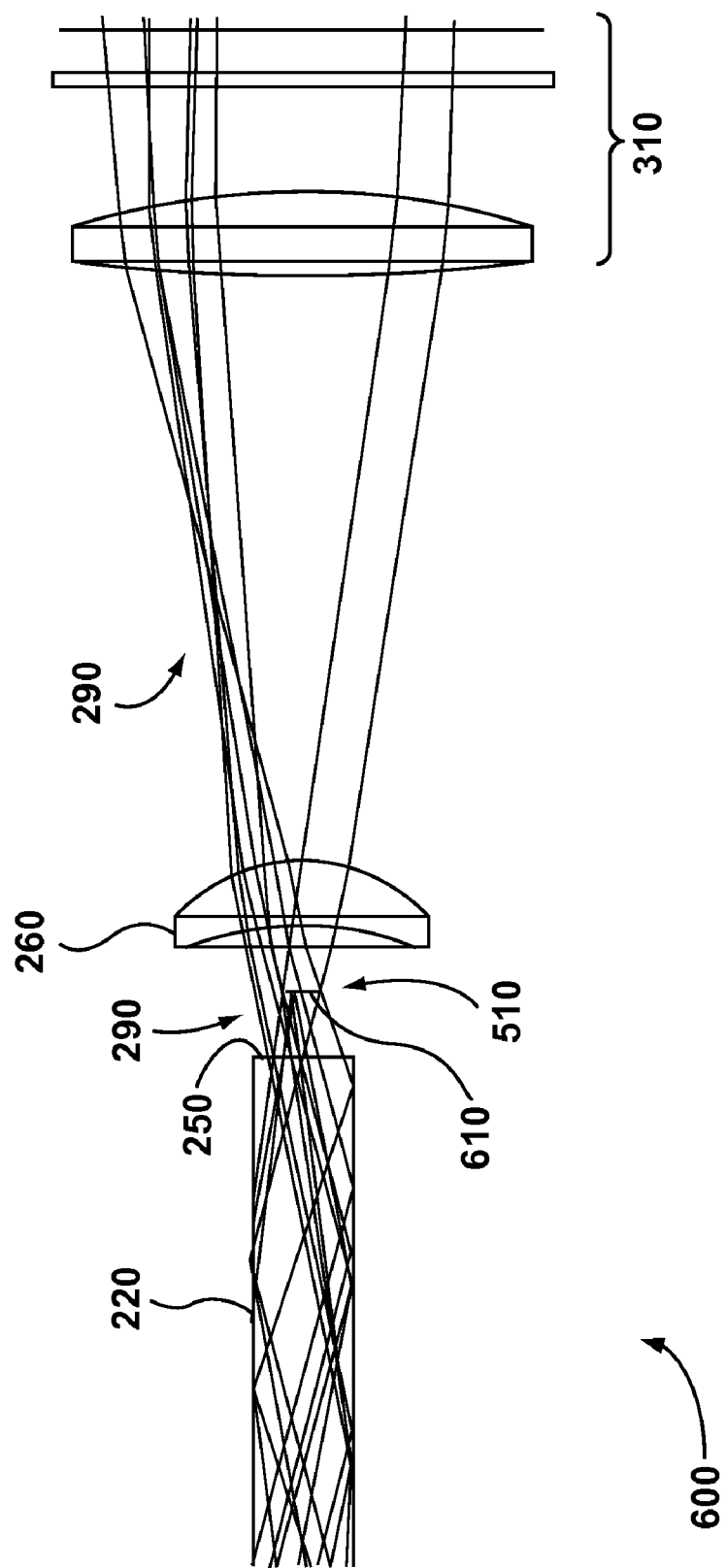
FIG. 7 depicts detail of the system depicted in FIG. 6, according to a non-limiting embodiment.

The situation is further illustrated in FIG. 7, which depicts detail of the system 600 (similar to FIG. 3) to illustrate additional light rays 290 as they emerge from the exit 290 of the integrator 220 (partially depicted), with lights rays 290 that contribute to a central area of the light emitted from the exit 250 being reflected back towards to the lamp 210 (not depicted in FIG. 7)), and light rays 290 that contribute to an edge and/or corner area of the light emitted from the exit 250 passing through the illumination relay optics (including the lens 260, and the additional components 310). The light rays 290 which are reflected back towards the lamp 290 serve to increase the brightness of the edge and/or central area.

Figure 8:
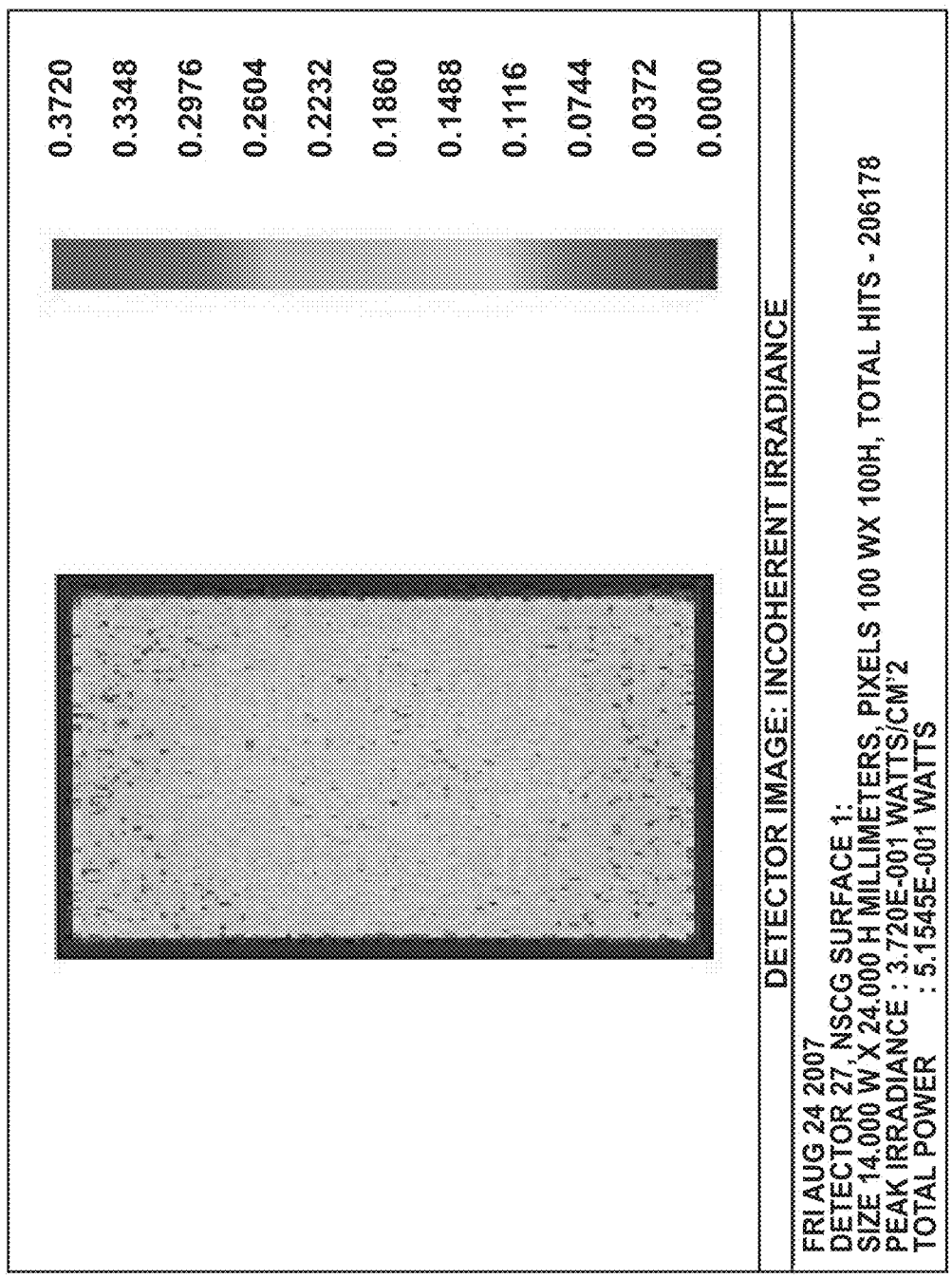
FIG. 8 depicts measured uniformity of light illuminating a light modulator, the light originating from a prototype of the system depicted in FIG. 6, according to a non-limiting embodiment.
Figure 11:
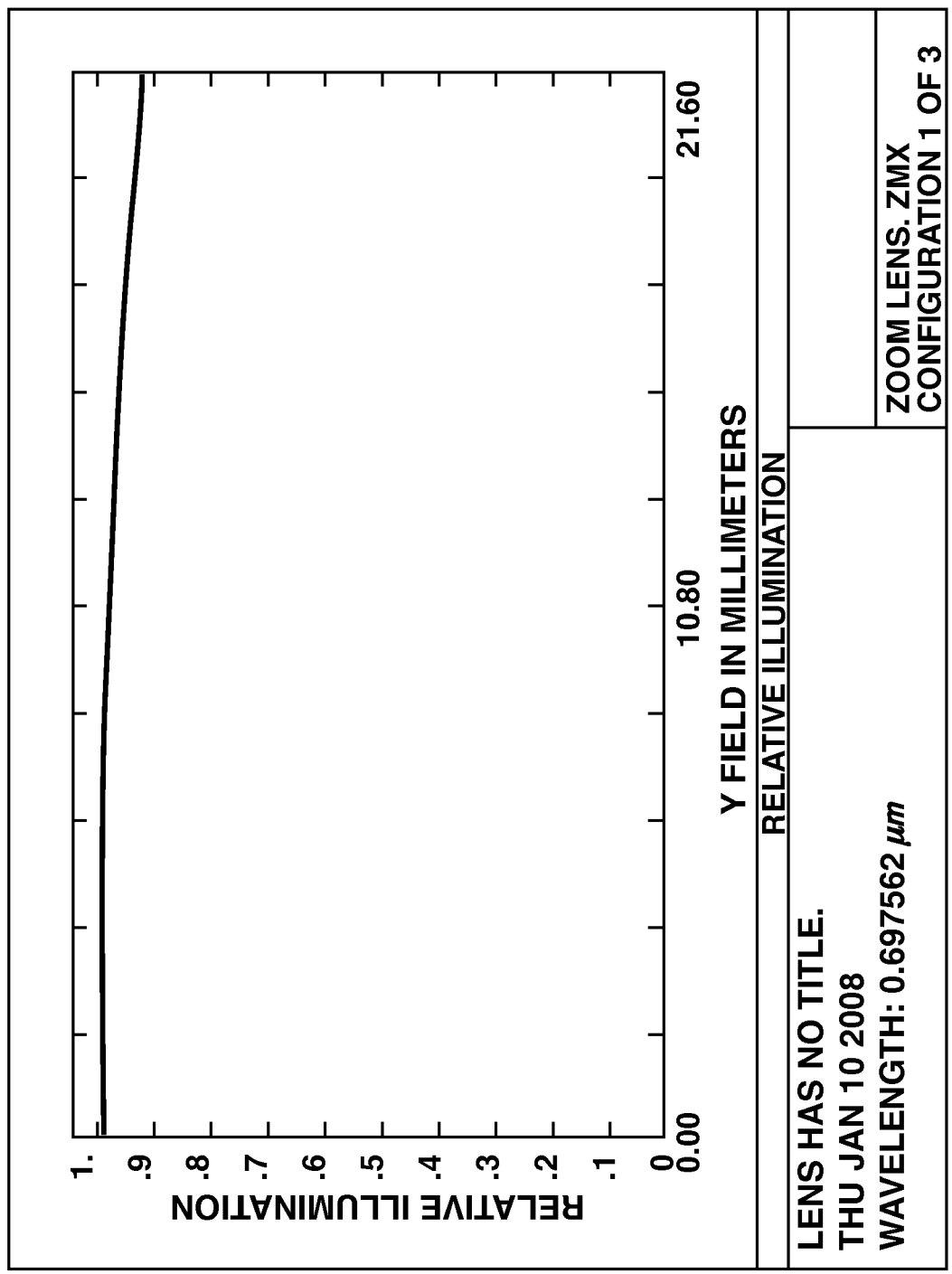
FIG. 11 depicts a relative illumination profile of a projection lens system, according to a non-limiting embodiment.

This is further illustrated in FIG. 8 which depicts the simulated uniformity of light illuminating a DMD, in a prototype of the system 600. The brightness of the corners of the light illuminating the DMD are seen to be increased in comparison to FIG. 4, while the brightness of the central area are seen to be decreased in comparison to FIG. 4. Further, while the corner and edge illuminance of FIG. 8 appears much brighter than the center, this is not representative of the image profile of what would be projected onto a screen surface, for example in a review room. To visualize what is occurring at the screen surface, the optical effects of the projection lens system must be taken into account. Indeed, it is understood that projection lenses have a property of relative illumination which describes the amount of light collected vs. the lens field angle. As can be seen in FIG. 11, which depicts the relative illumination of a projection lens vs. the lens field in millimeters, according to a non-limiting embodiment, relative illumination at the centre of the lens is higher than that at the edges of the lens. Hence, when the relative illumination of the projection lens of FIG. 11 is combined with the DMD illumination profile of FIG. 8, a net uniform brightness distribution on the screen is achieved, as shown in the test results of Table 1 as described below.

Figure 9:
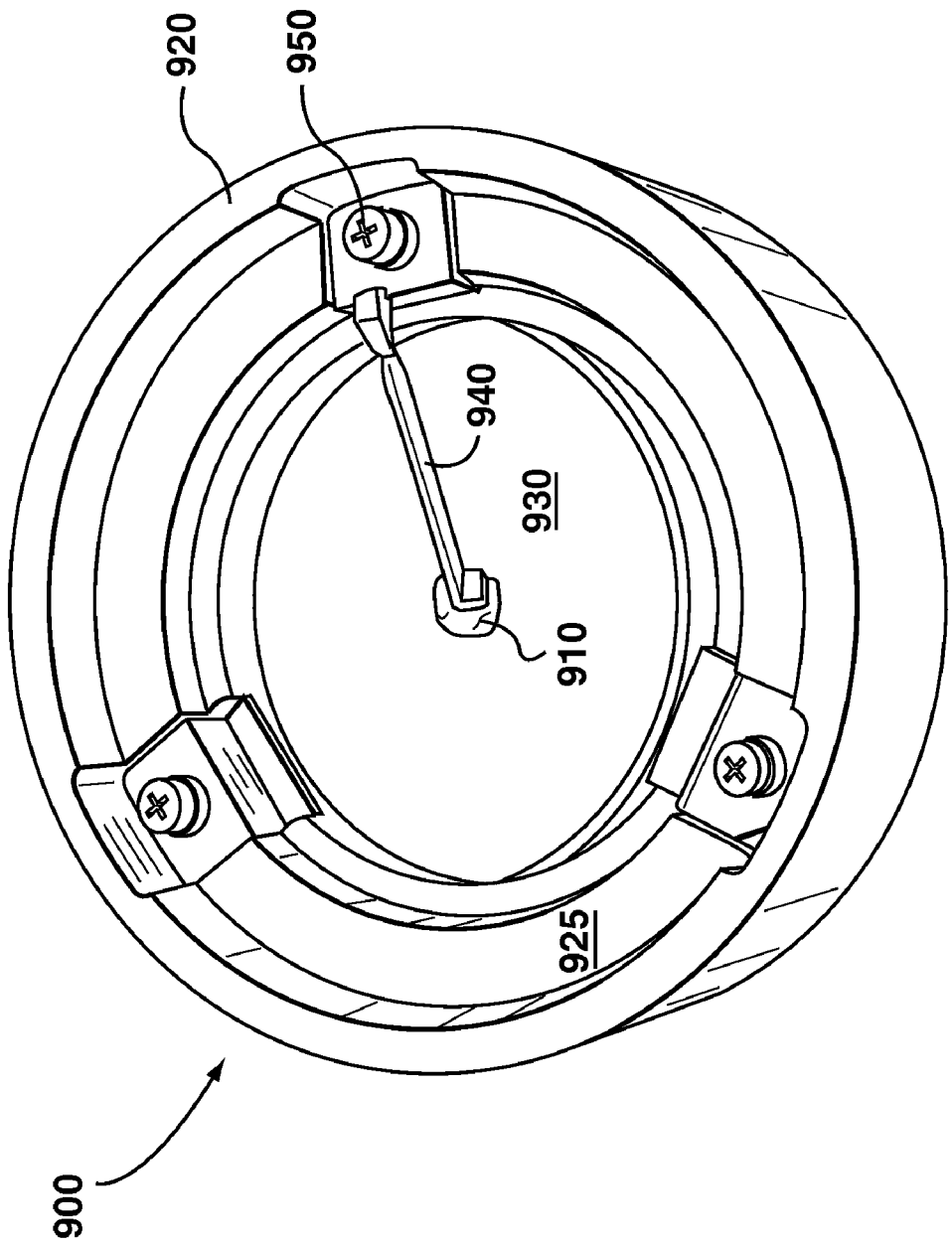
FIG. 9 depicts an apparatus for adjusting the uniformity of light emitted from a light production system of a projector, according to a non-limiting embodiment.

Attention is now directed to FIG. 9 which depicts a successful prototype of an apparatus 900 for adjusting the uniformity of light emitted from a light production system of a projector, such as the system 200. The apparatus comprises a light reducing portion 910 having an area less than that of an exit of an integrator, such as the integrator 220, the light reducing portion 910 for reducing the brightness of a central area of light emitted from the exit of the integrator, similar to the LRP 510. The apparatus 900 further comprises a mounting portion 920 for mounting the light reducing portion 910 in general axial alignment with the center of an exit of an integrator, the mounting portion 920 being generally compatible for mounting in a light production system of a projector. The mounting portion 920 comprises a sleeve 925, which defines an optical aperture 930 that is transparent to light, for example light emitted from the exit of an integrator. In the successful prototype, the optical aperture 930 comprises the lens 260, the light reducing portion 920 comprises a reflective metal disc (such as aluminum, or any other suitable reflective metal), and the light reducing portion 910 is held in place, generally in the center of the optical aperture 930 with a metallic arm 940 attached to a screw 950 in the mounting portion 920. While the arm 940 contributes to the reduction of light in a projected image, the effects of the arm 940 were reduced in the prototype by rotating the apparatus 900. In one non-limiting embodiment, the optical aperture 930 comprises glass.

The mounting portion 920, including the sleeve 925, may be manufactured from magnesium, magnesium alloys, aluminum and/or any other suitable material. In some embodiments, magnesium and/or magnesium alloys may be desirable, however, as magnesium and/or magnesium alloys are generally moldable and are lower weight compared to aluminium. However the material from which the mounting portion 920 is manufactured is not to be considered particularly limiting.

Using the successful prototype of the apparatus 900 in place of the lens 260 in the system 200, the results shown in Table 1 were obtained, measuring brightness of a projected image on a screen using the specification of FIG. 1. The reflective disc of metal in the prototype had a diameter of approximately 4.3 mm, relative to integrator exit dimensions of 12 mm×7 mm.

TABLE 1

|  | Relative Center Screen Brightness (lx) | Corner Brightness Uniformity for Review Rooms (lx) |
|---|---|---|
| Reference (using lens 260) | 4440 | 74% |
| With apparatus 900 | 3810 | 87% |

Hence Table 1 shows that the uniformity may be increased from 74% to 87%, with a relative loss in brightness at the center screen of about 14%. Further calculations have determined that a smaller disc would result in a relative loss in brightness at the center screen of less than 10%, with a corner brightness uniformity that is still in line with DCI specifications.

Figure 10:
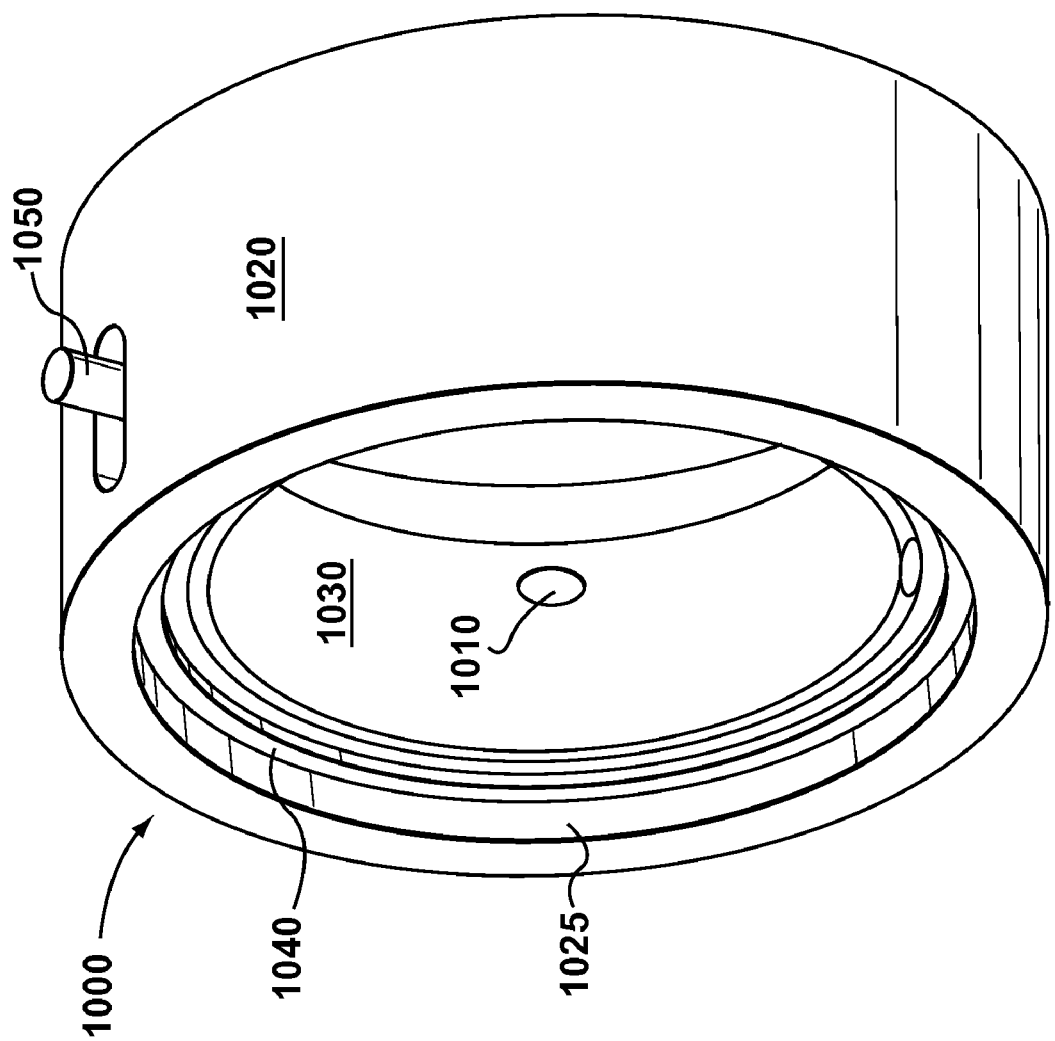
FIG. 10 depicts an apparatus for adjusting the uniformity of light emitted from a light production system of a projector, according to a non-limiting embodiment.

Attention is now directed to FIG. 10 which depicts an alternative embodiment of an apparatus 1000 for adjusting the uniformity of light emitted from a light production system of a projector, such as the system 200. The apparatus comprises a light reducing portion 1010 having an area less than that of an exit of an integrator, such as the integrator 220, the light reducing portion 1010 for reducing the brightness of a central area of light emitted from the exit of the integrator, similar to the LRP 510. The apparatus 900 further comprises a mounting portion 1020 for mounting the light reducing portion 1010 in general axial alignment with the center of an exit of an integrator, the mounting portion 1020 being generally compatible for mounting in a light production system of a projector. The mounting portion 1020 comprises a sleeve 1025, which defines an optical aperture 1030, that is transparent to light, for example light emitted from the exit of an integrator. In one non-limiting embodiment, the optical aperture 1030 comprises glass, the mounting portion 1020 comprises a collar 1040 enabled to hold the glass, and the light reducing portion 1010 comprises a coating on the glass, the coating being generally centered on the optical aperture 1030. In some embodiments, the light reducing portion 1010 comprises a metal coating, while in other embodiments the light reducing coating comprises a dielectric coating. In some embodiments, the light reducing portion 1010 is reflective, while in other embodiments the light reducing portion 1010 is partially reflective. In yet further embodiments, the light reflective coating 1010 is diffuse. In some embodiments, the light reflective coating 1010 may be partially reflective and partially transparent. The reflective coating is generally adapted to handle a high light flux from a light source, such as the lamp 210. In some non-limiting embodiments, where a dielectric coating is used, a reactive metal oxide sputtering process may be used to adhere the coating to the glass substrate.

In some embodiments, the light reducing portion 1010 is generally circular, while in other embodiments, the light reducing portion 1010 may have a shape which is similar to the shape of the exit of an integrator.

In some embodiments, the optical aperture 1030 comprises the lens 260, eliminating the need for an additional component in the system 200.

In some embodiments, the optical aperture 930 may be coated with an anti-reflective coating on one or both sides, to reduce reflection losses.

In some embodiments, the collar 1040 and optical aperture 1030 (i.e. glass or lens) is enabled to move along a longitudinal axis of the apparatus 1000, within the sleeve 1025, using a position adjusting unit 1050. Hence, the position of the light reducing portion 1010 may be adjusted relative to an integrator when the apparatus is mounted in a light production system (e.g. of system 200), hence the making the brightness uniformity adjustable. As the light reducing portion 1010 moves closer towards the integrator, the magnitude of brightness uniformity correction is increased.

In some of these embodiments, the position of the light reducing portion 1010 may be adjusted manually by a user interacting with the position adjusting unit 1050. In other embodiments, the position adjusting unit 1050 may further comprise electromechanical components, such as a server motor, enabled to communicate with a closed loop electronic feedback system, via projector control software. For example, the closed loop feedback system may be used by the projector to capture an image profile of light emitted from the exit of the integrator, for example when the light is projected on a screen, via a camera system mounted within the projector. The camera captures the screen brightness profile to be interpreted by the projector. A correction signal is then sent to the electromechanical components, such as the server motor, to move the collar 1040, and hence the light reducing portion 1010, to bring the brightness profile to a given level. For example, a person of skill in the art would understand that projector brightness uniformity can change over time. Hence, such a closed loop auto-brightness control enables the projector to maintain the desired brightness uniformity over time. Further, in other embodiments, image profile of light emitted from the exit of the integrator may be captured directly from the exit of the integrator, or at any other suitable place within the illumination relay optics, or after the light is reflected from the light modulator, presuming the relative illumination profile of the projection lens system is taken into account.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An apparatus for adjusting the uniformity of light, comprising
a light reducing portion, having an area less than that of an exit of an integrator, for reducing the brightness of a central area of light emitted from said exit, such that light outside said central area continues in a path towards illumination relay optics; and
a mounting portion for mounting said light reducing portion in general longitudinal alignment with a center of said exit, said mounting portion enabled to transmit said light emitted from said exit.

2. The apparatus of claim 1, wherein a lamp facing side of said light reducing portion is enabled to reflect said light back towards said exit and through said integrator, such that said light is further reflected from a reflector of a lamp in axial alignment with an entrance of said integrator and back through said integrator, re-emerging from said exit in an area outside of said central area.

3. The apparatus of clam 1, wherein said mounting portion further comprises a position adjusting unit for adjusting a position of said light reducing portion relative to said exit.

4. The apparatus of claim 3, wherein said position adjusting unit comprises an electro-mechanical device for remote control of said position.

5. The apparatus of claim 4, wherein said position adjusting unit is enabled to communicate with a feedback system for receiving signals from said feedback system for adjusting said position such that a brightness profile is adjusted to a given level, said feedback system for capturing a brightness profile of said light emitted from said exit.

6. The apparatus of claim 1, further comprising a light transmitting portion surrounding said light reducing portion, said light transmitting portion attached to said mounting portion.

7. The apparatus of claim 6, wherein said light reducing portion comprises an optical coating on said light transmitting portion.

8. The apparatus of claim 7, wherein said optical coating comprises at least one of a metallic coating and a dielectric coating.

9. The apparatus of claim 7, wherein said optical coating is at least one of reflective, partially reflective, and diffuse.

10. The apparatus of claim 6, wherein said light reducing portion comprises at least one of glass and a lens.

11. The apparatus of claim 1, wherein said light reducing portion comprises a disc attached to said mounting portion via a supporting arm.

12. The apparatus of claim 1, wherein said mounting portion comprises a sleeve mountable within a light production system of a projector.

13. A light production system comprising,
a lamp for producing a beam of light;
an integrator having an entrance in longitudinal alignment with said lamp and enabled for accepting said light, an exit for emitting said light, and a body for conveying said light to said exit;
illumination relay optics for conveying said light emitted from said exit through said projector, said exit arranged to channel light to said illumination relay optics; and
a light reducing module, having a light reducing portion of an area less than that of said exit, for reducing the brightness of a central area of light emitted from said exit, such that light outside said central area continues in a path towards said illumination relay optics, and a mounting portion for mounting said light reducing portion in general longitudinal alignment with a center of said exit, said mounting portion enabled to transmit said light emitted from said exit.

14. The light production system of claim 13, wherein a lamp facing side of said light reducing portion is enabled to reflect said light back towards said exit and through said integrator, such that said light is further reflected from a reflector of said lamp in axial alignment with said entrance and back through said integrator, re-emerging from said exit in an area outside of said central area.

15. The light production system of claim 13, wherein said mounting portion further comprises a position adjusting unit for adjusting a position of said light reducing portion relative to said exit.

16. The light production system of claim 15, wherein said position adjusting unit comprises an electro-mechanical device for remote control of said position.

17. The light production system of claim 16, further comprising a feedback system for capturing a brightness profile of said light emitted from said exit, wherein said position adjusting unit is enabled to communicate with said feedback system for receiving signals from said feedback system for adjusting said position such that a brightness profile is adjusted to a given level.

18. The light production system of claim 13, wherein said light reducing module further comprises a light transmitting portion surrounding said light reducing portion, said light transmitting portion attached to said mounting portion.

19. The light production system of claim 18, wherein said light reducing portion comprises an optical coating on said light transmitting portion.

20. The light production system of claim 19, wherein said optical coating comprises at least one of a metallic coating and a dielectric coating.

21. The light production system of claim 19, wherein said optical coating is at least one of reflective, partially reflective, and diffuse.

22. The light production system of claim 13, wherein said light reducing portion comprises a disc attached to said mounting portion via a supporting arm.

23. The light production system of claim 13, wherein said mounting portion comprises a sleeve mountable within a light production system of a projector.

24. The light production system of claim 13, wherein said light production system comprises a component of a projector, said projector comprising:
a light modulation apparatus for accepting light from said illumination relay optics and causing said light from said illumination relay optics to be formed into an image; and
at least one projection component for accepting said image from said light modulation apparatus and projecting said image.

* * * * *